United States Patent [19]
Ciavattoni et al.

[11] 3,817,576
[45] June 18, 1974

[54] DENTAL CHAIR WITH ADJUSTABLE HEADREST

[75] Inventors: Anthony Ciavattoni; Thomas J. Schubert, both of Richmond, N.Y.

[73] Assignee: Pennwalt Corporation, Philadelphia, Pa.

[22] Filed: Oct. 2, 1972

[21] Appl. No.: 294,142

[52] U.S. Cl................ 297/408, 297/397, 297/410
[51] Int. Cl............................ A47c 7/36, A47c 7/42
[58] Field of Search ............ 297/408, 410, 409, 396

[56] References Cited
UNITED STATES PATENTS

| | | | |
|---|---|---|---|
| 3,547,486 | 12/1970 | Herzer | 297/410 |
| 3,603,642 | 9/1971 | Laessker | 297/408 |
| 3,698,765 | 10/1972 | Olsen | 297/410 |

*Primary Examiner*—Casmir A. Nunberg
*Attorney, Agent, or Firm*—Edward A. Sager

[57] ABSTRACT

A headrest mounted to the top of a chair backrest can easily be unlocked, grasped, and pivoted forward and backward with respect thereto using only one hand. A pawl mechanism which locks the headrest in any one of numerous predetermined positions throughout its range of travel, has a handle which can be easily depressed to unlock the headrest by inserting the fingers through an access opening in the back of the headrest.

7 Claims, 4 Drawing Figures

3,817,576

DENTAL CHAIR WITH ADJUSTABLE HEADREST

BACKGROUND OF THE INVENTION

Present dental chairs having headrests which are adjustable (pivotable) in forward and backward directions with respect to the backrests of the chairs, generally have one or the other of two primary mechanisms for adjusting the headrests.

The first adjusting mechanism utilizes a screw type device for moving the headrest, the screw type device being actuated by a small handwheel which has a scalloped periphery which is accessible from the side of the headrest; the wheel is rotated with the fingers to actuate the screw mechanism, and consequently move the headrest. Although it is possible to move the headrest with only one hand with this mechanism, it is done only with some difficulty because the scalloped edge of the handwheel irritates the fingers, and it also takes a relatively long period of time to move the headrest through its entire range of movement if this is necessary.

The second adjusting mechanism utilizes a locking device which locks the headrest in various positions, and which is unlocked by depressing a button on the side of the headrest. With this mechanism, however, it is extremely difficult to move the headrest using only one hand, because the button must be depressed until the headrest is moved to the desired position; consequently, one hand is used to depress the button, while the other moves the headrest to the desired position.

Consequently, what is needed is a headrest which can be quickly and easily moved to any position within its range of movement using only one hand.

SUMMARY OF THE INVENTION

The present invention relates to a dental chair having an adjustable headrest mounted to the top of the chair backrest, which headrest can be easily and quickly moved (pivoted) forward and backward with respect to the backrest using only one hand.

More particularly, the headrest incorporates a pawl mechanism for locking the headrest in any one of numerous predetermined positions, the pawl mechanism having a pawl handle which is depressed to unlock the headrest. One end of the pawl handle is depressed by inserting the fingers through an access opening in the back of the headrest, that end of the pawl handle and the access opening both being located sufficiently close to an edge of the headrest so as to permit the headrest to be quickly and easily grasped, unlocked, and adjusted using only one hand.

DETAILED DESCRIPTION OF THE INVENTION

Figure 1:
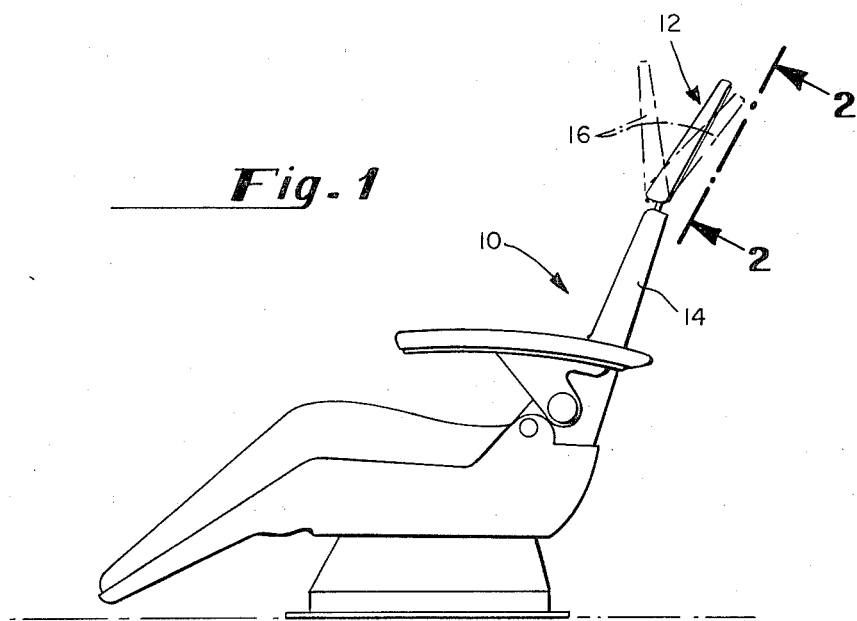
FIG. 1 is a side view of a dental chair and headrest, showing the headrest in various positions.

Referring to FIG. 1, a dental chair 10 has a headrest 12 mounted to the top of the backrest 14, the headrest being mounted so that it can be moved to various positions as indicated by the phantom line positions 16.

Figure 2:
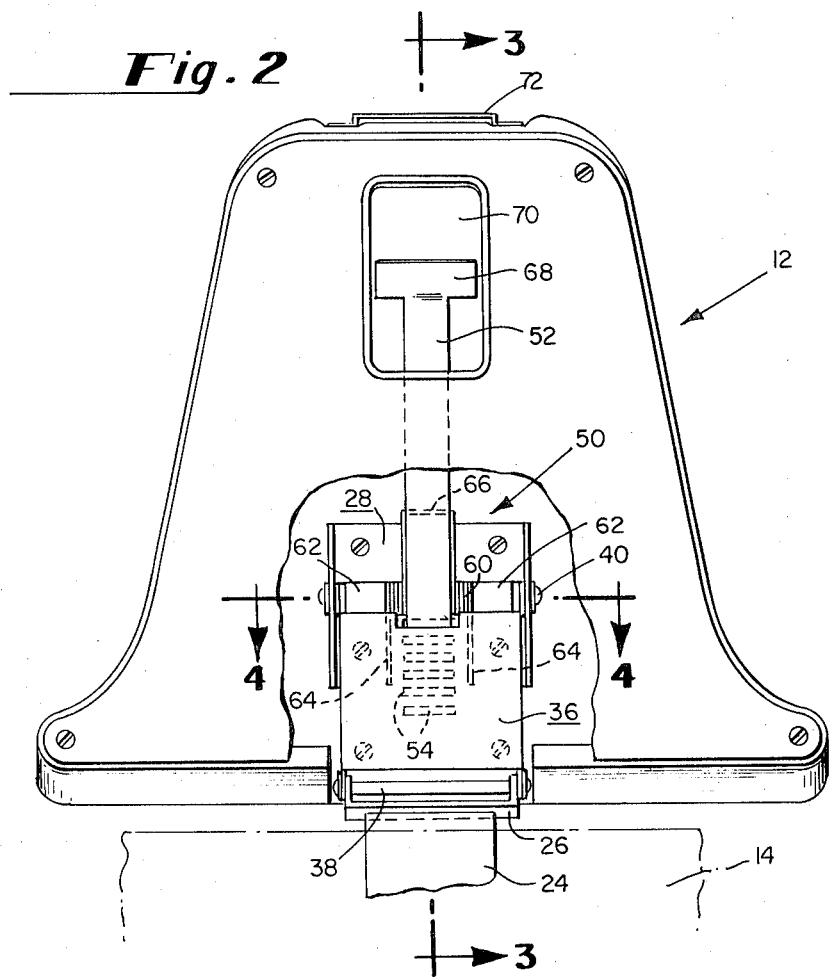
FIG. 2 is a back view of the headrest taken through line 2—2 of FIG. 1.

The headrest 12 (FIGS. 2 abd 3) includes a rest member 18 against which a patient may rest his head, the latter being comprised of a frame 20 having a suitable cushion 22 affixed thereto. To mount the headrest 12 to the top of the backrest 14 so that it can be pivoted about a horizontal axis with respect thereto, a support bar 24 is mounted to the top of the backrest; a pivot plate 26 is fixedly connected to the bar 24.

Rest member 18 also includes a mounting plate 28 which is fixedly connected to the back of the frame 20, the mounting plate having a loop (not shown) formed at its lower end through which a pin 30 extends. Thus, mounting plate 28, and consequently rest member 18, are both pivotally connected to the pivot plate 26 at a first location thereon by the pin 30. A small shield 32 separates the cushion 22 from the pin 30, the shield being fixedly connected to the frame 20 by means of rivets 34.

Slide structure movable transverse to the horizontal, pivotal axis of the headrest 12 will now be described.

Figure 3:
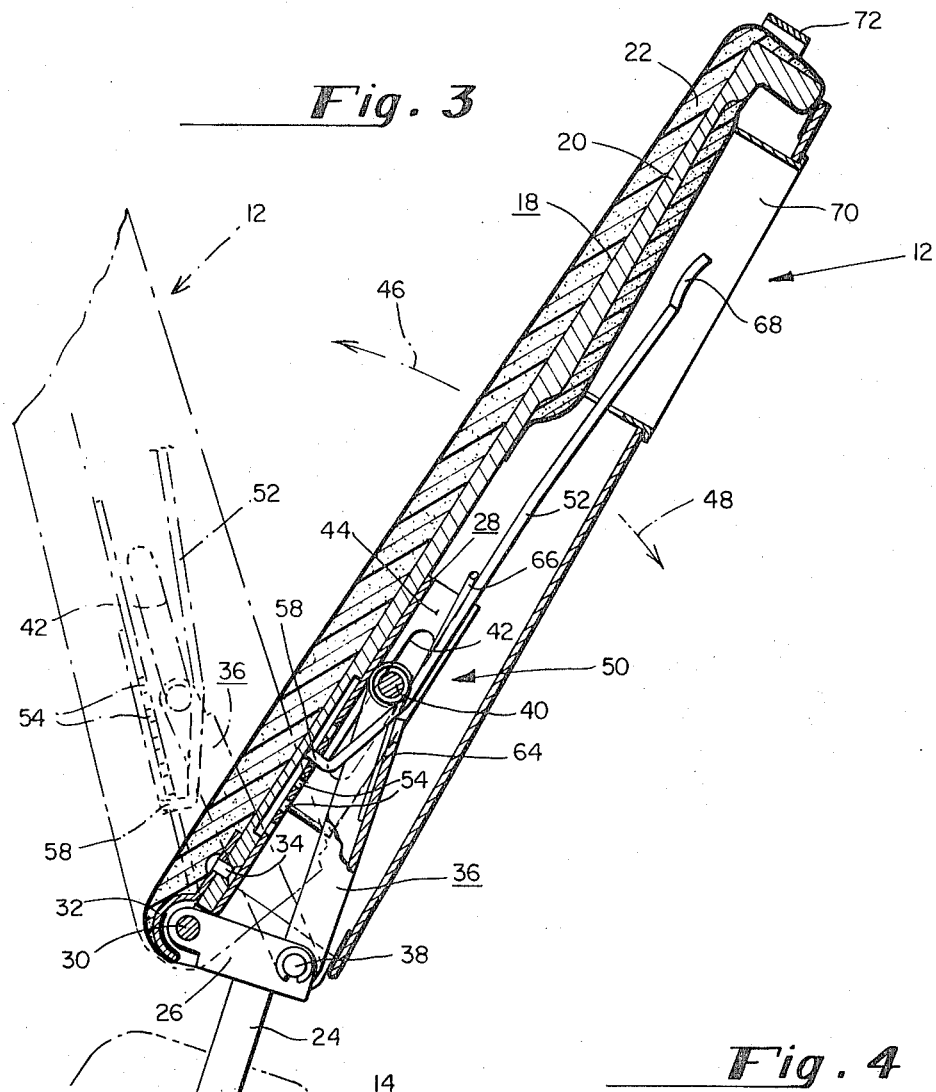
FIG. 3 is a sectional view taken through line 3—3 of FIG. 2 showing the internal adjusting and locking mechanism.
Figure 4:
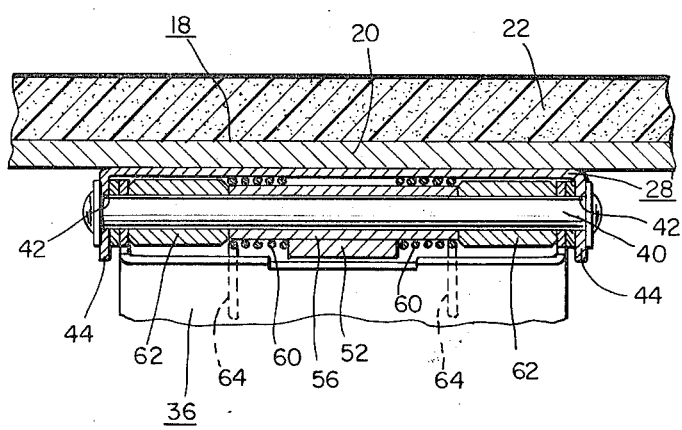
FIG. 4 is a sectional view taken through line 4—4 of FIG. 2, showing a lever pin slidably mounted within a slot within the headrest, and showing how the pawl handle is connected to this pin.

A lever 36 is pivotally connected to pivot plate 26 at a second location thereon by means of a pin 38. The other end of the lever 36 includes a pin 40, the latter being slidably confined within a slot 42 of predetermined length which is formed within each of two legs 44 (FIG. 4) of the mounting plate 28. Thus, assuming that the pin 40 is free to move within slots 42, the pin will move within the slots from the solid line position in FIG. 3 to the phantom line position when the headrest 12 is moved about the axis of pin 30 forward in the direction of the arrow 46; backward movement of the headrest about its pivotal axis is in the direction of the arrow 48. As can be seen in FIG. 3, the extreme limit of travel of headrest 12 is determined by the length of slots 42 which slots confine the movement of pin 40 to a predetermined path of predetermined length.

To lock the pin 40 in any one of various positions along slots 42, locking means in the form of a pawl mechanism 50 is provided which comprises a pawl handle 52 and indexing means forming a row of openings 54 in the mounting plate 28. The openings 54 are spaced apart in a direction transverse to the pivotal axis of the headrest 12 and serve as locking elements. Pawl handle 52 is rotatably mounted to pin 40 by means of a sleeve 56 which is fixedly connected to the handle, one end 58 of the handle being formed so as to be engagable with each of the openings 54. The said one end 58 serves as a locking member engageable with at least one of the openings 54 in order to secure the headrest 12 in a selected position about the pivotal axis of pin 30. A spring 60 surrounds sleeve 56, and is retained in place by a spacer 62 located on each side thereof. The spring 60 is under tension so as to bias the end 58 toward openings 54, the ends 64 of the spring extending downwardly against lever means 36, and a closed loop 66 extending upwardly against handle 52.

It should be noted that the other end 68 of handle 52 is located near the upper side and top edges of the headrest and can be depressed to unlock the headrest 12 by inserting the fingers through an access opening 70 formed in the back of the headrest. By locating the end 68 adjacent an edge of the headrest 12 where the thumb of the actuating hand can grasp the headrest while the fingers simultaneously depress the handle 52 to unlock the headrest, the latter can be easily and quickly adjusted to any desired position using only one hand. The bias of the spring 60 also resists backward motion of the headrest.

A bracket 72 connected to the top edge of headrest 12 confines the strap of a crade headrest (not shown) if one is desired.

What I claim is:

1. The combination of a dental chair with a headrest, said headrest comprising supporting means which is mounted to the upper end of the backrest of said chair, rest means against which a patient may rest his head while sitting in said chair, said rest means extending upwardly from the top of said backrest and being pivotly connected at its lower end to a first location on said supporting means so as to permit said headrest to be pivoted forward and backward with respect to said backrest, lever means pivotly connected at one end thereof to a second location on said supporting means, means connected to the back of said rest means for slidably confining the movement of the other end of said lever means to a predetermined path of predetermined length when the headrest is pivoted about said first location on said supporting means, and means for locking the other end of said lever means in any one of various positions along said path so as to lock said headrest in a desired position with respect to said chair.

2. The combination set forth in claim 1, wherein said confining means comprises a member having a slot formed therein, wherein said lever means includes a pin mounted for sliding movement within said slot, and wherein said locking means includes indexing means forming a row of openings along the back of said rest means, a pawl handle rotatably mounted between its ends to said pin, one end of said handle being formed so as to be engagable with each of said openings and being disposed adjacent said row of openings, and means for biasing said one end of said handle toward said row of openings.

3. The combination set forth in claim 2, wherein said headrest further includes means enclosing said lever means and said handle, but defining an access opening adjacent the other end of said handle so that said handle can be depressed to thereby unlock said headrest.

4. The combination set forth in claim 3, wherein the other end of said handle and said access opening are disposed adjacent an edge of said headrest which permits said handle to be depressed and said headrest to be grasped simultaneously using only one hand.

5. In a dental chair having a backrest, a headrest, and means supporting said headrest on said backrest including means pivotally connecting a lower portion of said headrest to said supporting means for movement about a horizontal axis relative to said backrest, that improvement comprising slide structure movable transverse to said axis and connected between said supporting means and said headrest for guiding said headrest during movement thereof about said axis, and locking means including a series of locking elements spaced transverse to said axis on said headrest and further including a locking member carried by said slide structure for movement therewith, said locking member being engageable with at least one of said locking elements to secure said headrest in a selected position about said axis.

6. A dental chair according to claim 5 further including means biasing said locking member into engagement with said locking element.

7. A dental chair according to claim 6 wherein said backrest has a front portion contacted by an occupant of said chair and a back portion on the reverse side of said front portion, and wherein said biasing means resists motion of said headrest about said axis in backward direction away from said front portion toward said back portion.

* * * * *